April 5, 1938. W. E. HAUPT 2,113,137
TESTING DEVICE FOR MULTIPLE CYLINDER INTERNAL COMBUSTION ENGINES
Filed March 24, 1936 4 Sheets-Sheet 2
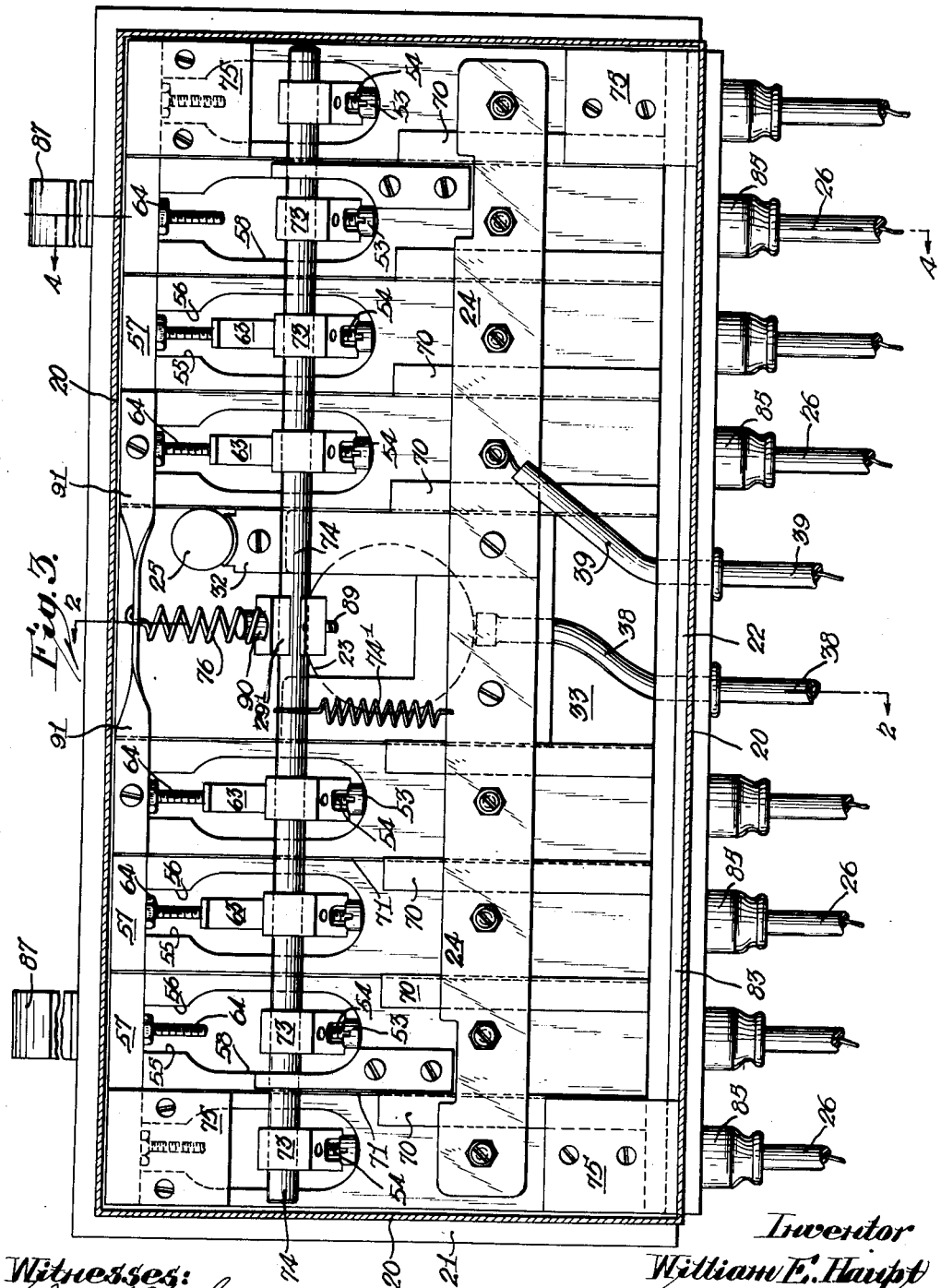
Inventor
William E. Haupt April 5, 1938. W. E. HAUPT 2,113,137
TESTING DEVICE FOR MULTIPLE CYLINDER INTERNAL COMBUSTION ENGINES
Filed March 24, 1936 4 Sheets-Sheet 3
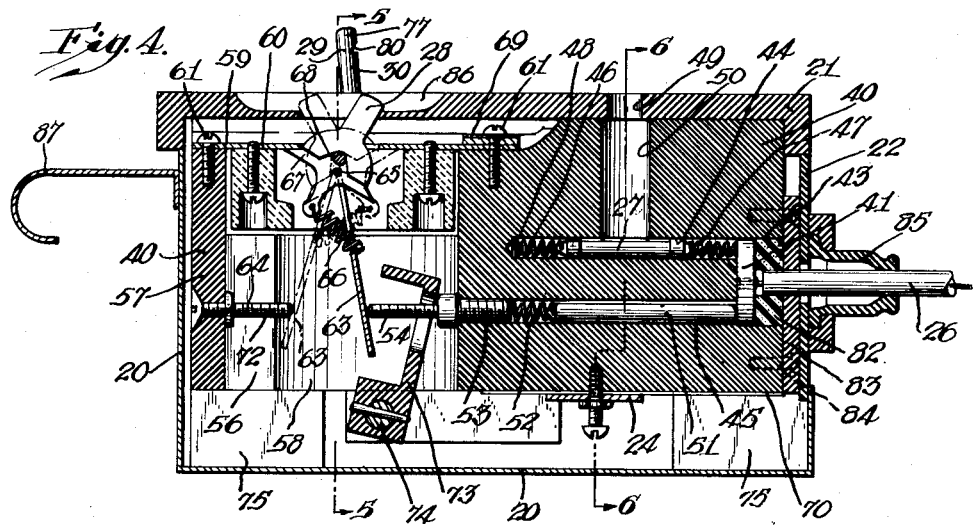

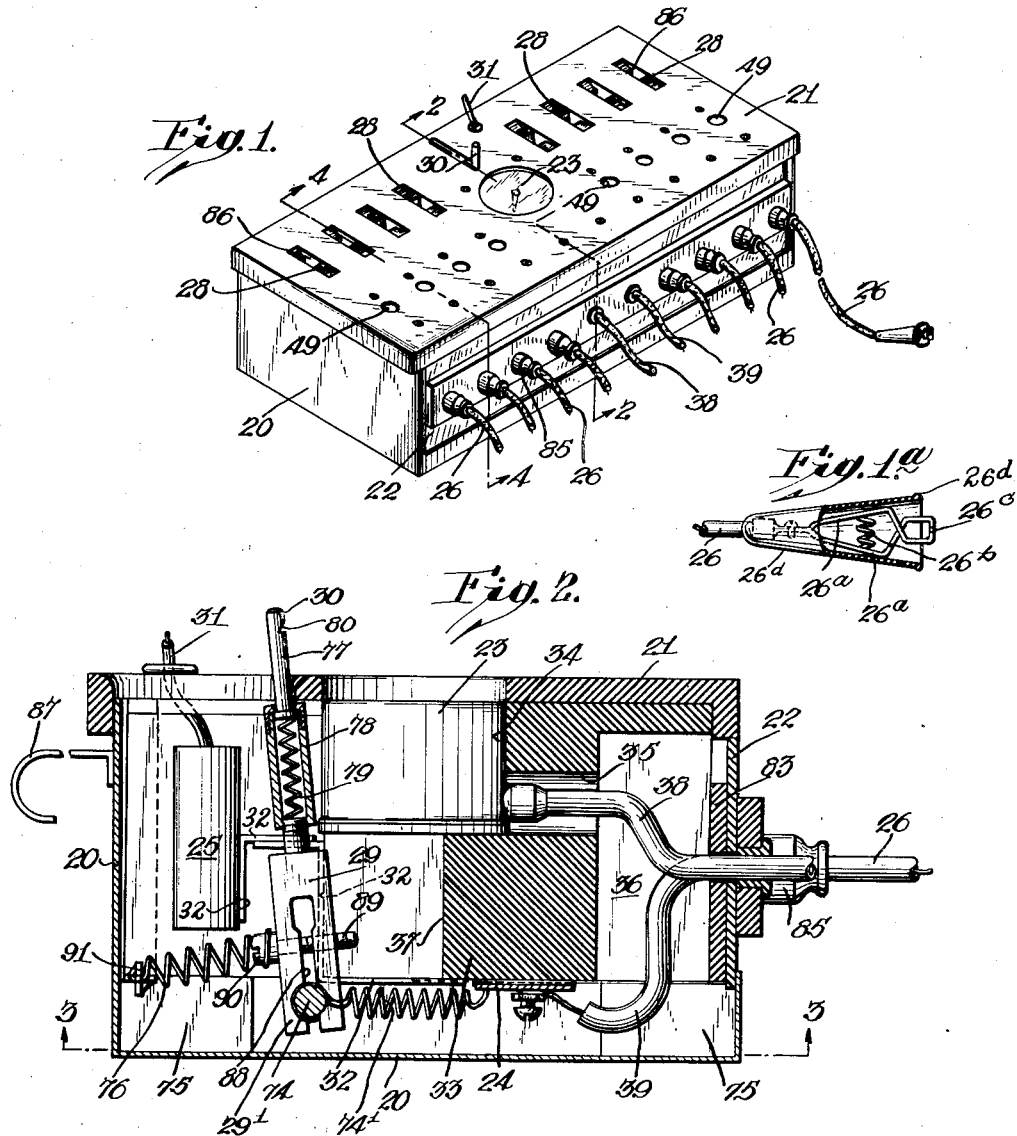

April 5, 1938.  W. E. HAUPT  2,113,137
TESTING DEVICE FOR MULTIPLE CYLINDER INTERNAL COMBUSTION ENGINES
Filed March 24, 1936  4 Sheets-Sheet 4
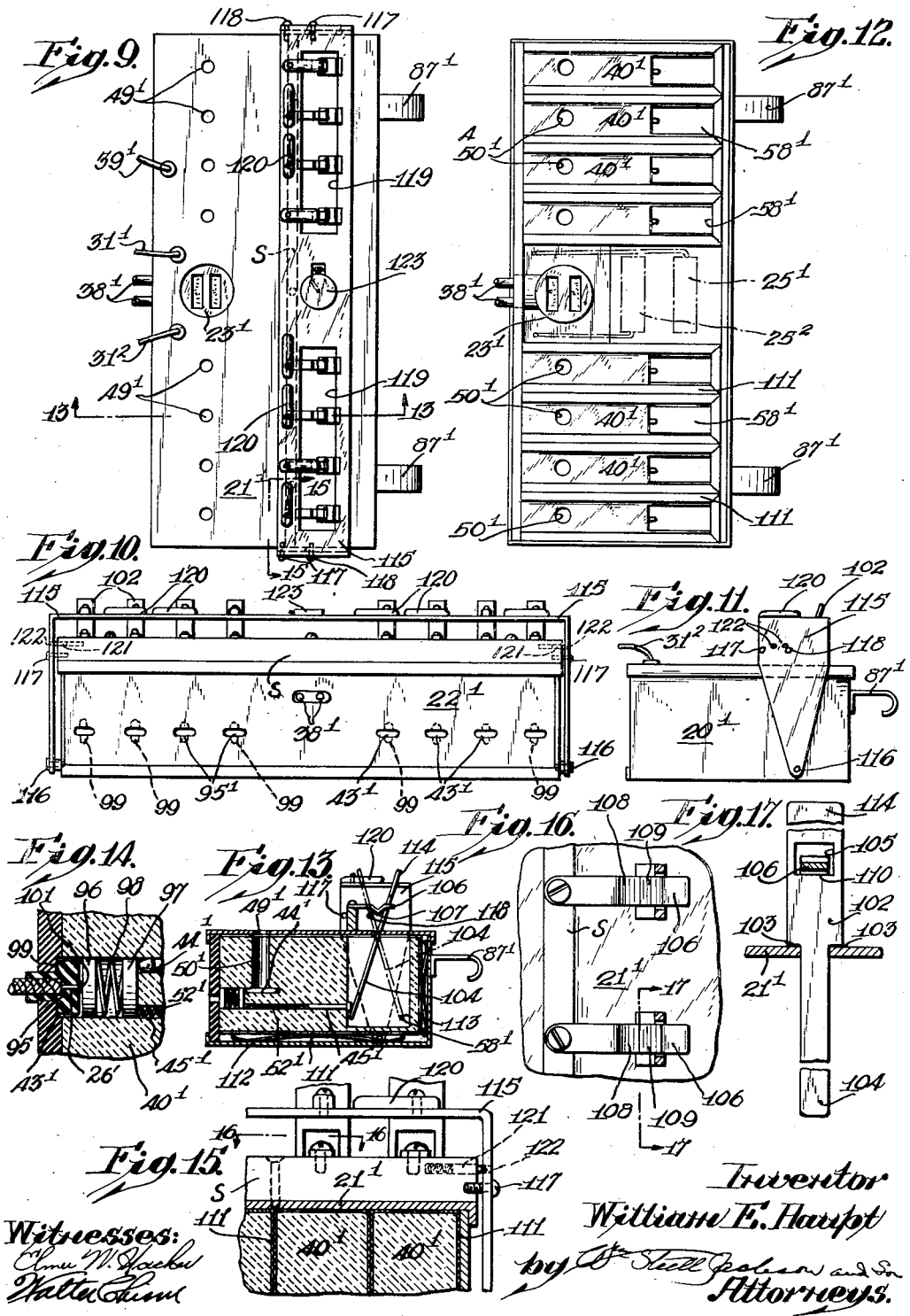

Patented Apr. 5, 1938

2,113,137

UNITED STATES PATENT OFFICE 2,113,137

TESTING DEVICE FOR MULTIPLE CYLINDER INTERNAL COMBUSTION ENGINES

William E. Haupt, Brooklawn, N. J.

Application March 24, 1936, Serial No. 70,568

8 Claims. (Cl. 175—183)

My present invention relates both to engine testing methods and to an engine testing device intended for any use to which it may be adapted but especially intended for testing the present conventional automotive type engine.

A purpose of the invention is to provide methods and means for easy, effective and rapid investigations of the operating characteristics of engines of the character indicated and under different operating conditions.

A further purpose is to combine a vacuum gauge or/and a test condenser with spark-plug selective grounding devices, preferably including a neon tube or other suitable high tension indicator in connection with each spark plug.

A further purpose is to relatively shield the internal connections of each individual spark plug test circuit and particularly of high tension test indicators such as neon tubes therein, one from the other, so as to protect each from the field of as well as from leakage to the other.

A further purpose is to offer substitute structure and functions which are of standard character and strength and which can be utilized in place of and in contrast or comparison with the structures and functions of the automotive engine being tested, so as to locate weaknesses and faults by the difference in operation of the engine when the substitutions have been made. This is particularly advantageous when a complete list of substitutions is available so that the substitution can be made quickly enough to test successively under approximately the same engine conditions.

A further purpose is to effect different methods explained at greater length in the specification and to furnish the mechanism by which these methods quickly and easily can be effected.

A further purpose is to provide connections for groups of individual circuits short of the full engine group along with grounding and release mechanism whereby the operation using any selected group and using the complete group of circuits available may be contrasted quickly.

A further purpose is to connect neon tubes or other high tension indicators in each of a plurality of spark plug test circuits which can be grounded at will so that the individual circuits can be tested under substantial full load conditions, operating all or any group of cylinders and changing quickly to a single cylinder or to operation of all of the cylinders.

A further purpose is to adjust the carburetor for quick pickup by using as a measure of the merit of adjustment, the shortness of time, for the vacuum to shift from its value at closed throttle idle speed to any selected open throttle high speed value, while noting at the neon tubes the continued maintenance of the ignition voltages during pick-up, and optionally while grounding one or more of the spark plugs.

A further purpose is to disclose compression faults, preferably after correcting any ignition and spark troubles, disclosing compression faults by comparing the different readings of a vacuum gauge with the cylinders operating on ignition one at a time alone, with the spark plugs of all other cylinders grounded and with the same full definite throttle opening for all.

A further purpose is to use neon tubes and the vacuum gauge in medium and higher speed load tests, with the throttle open and two or more only of the cylinders firing and with a no-load high speed test, to disclose any tendencies of the ignition system to weaken and any sticking of valves at these higher speed load and no-load high-speed conditions.

A further purpose is to test the engine while it is idling, to adjust the carburetor to give for the idling engine maximum manifold vacuum, then with the engine still idling to correct any ignition system faults until there is uniform flashing of the neon tubes, and then to check the firing or evenness of firing at the different cylinders by noting the relative rapidities of vacuum drop when different pairs of cylinders continue to fire while all the other cylinders are suddenly grounded.

One of the purposes of the invention is to utilize high tension electric indicators such as neon tubes in the individual circuits and shield the circuits one from another so as to secure the full accuracy and strength in each indication.

My invention relates both to the methods and mechanism whereby they may be carried out.

I have elected to illustrate two only of the different forms of my device, selecting forms however that are practical and efficient in operation and which well illustrate the principles involved and my new methods of testing.

Figure 1 is a perspective showing a desirable embodiment of my tester device.

Figure 1a is a fragmentary view partly in section showing a detail of my device.

Figure 2 is a vertical section, taken upon the line 2—2 of Figure 1 or the corresponding line 2—2 of Figure 3.

Figure 3 is a bottom sectional plan taken upon the line 3—3 of Figure 2.

Figure 4 is a vertical section taken upon the line 4—4 of Figure 1 or the corresponding line 4—4 of Figure 3.

Figures 5 and 6 are fragmentary longitudinal sections taken upon the lines 5—5 and 6—6 of Figure 4.

Figure 5a is a perspective view of a detail of Figure 5.

Figure 7 is a fragmentary top-plan showing an optional detail omitted in Figure 1.

Figure 8 is a section of Figure 7, taken upon the line 8—8 thereof.

Figures 9, 10 and 11 are top plan, front and end elevations, respectively, of another embodiment of my device.

Figure 12 is a plan view of the structure of Figures 9 to 11 without the cover and without mechanism removable therewith.

Figure 13 is a vertical section of Figure 9 taken upon line 13—13 thereof.

Figure 14 is an enlarged fragment of Figure 13 but showing a fragment of an external electrical conductor not shown in Figure 13.

Figure 15 is an enlarged scale fragmentary section upon the line 15—15 of Figure 9.

Figures 16 and 17 are fragmentary sections upon the lines 16—16 and 17—17 of Figures 15 and 16 respectively in the directions of the arrows, Figure 17, however showing a switch element in mid position, a different position than in Figures 13 and 16.

Like numerals refer to like parts in all figures.

Describing in illustration and not in limitation and referring to the drawings:

In the embodiment shown in Figures 1-8, the tester includes broadly supporting casing members 20, 21 and 22, a vacuum gauge 23 for connection to the intake manifold during test and electrical testing mechanism. Almost all of the connections and structure lie within the casing but require extensions of course to apply them, the vacuum gauge to the intake manifold and the electrical testing connections to the spark plugs and distributor.

The electrical testing mechanism includes a common ground strip 24, for grounding the spark plugs, a substitute condenser 25, high tension test wires 26 for connection to the spark plugs during test, neon or other high tension indicators 27, shunted with the respective test circuits, selective switches 28 for grounding the test circuits against the common ground individually, in selected groups or en masse and a common ground switch 29 with its control lever 30.

The terminal of the test wire 26 is shown in a standard form in which it is available on the market. As shown, it comprises oppositely facing reversed strips 26a pressed apart by a spring 26b to bring their jaws together at 26c. The user is protected against receiving a shock in use of the clip by an insulating cover 26d.

The substitute condenser is so arranged as to be applied within any of the circuits in parallel with or instead of the usual condenser.

One side, (conveniently the middle terminal) of the condenser 25 connects by a suitably insulated test lead 31 to the ignition system under test while the other side is shown grounded to the common ground strip 24 through a resilient strip 32 which also resiliently mounts the condenser 25. As shown the strip is soldered or otherwise secured to the metallic outside shell of the condenser at one end and at the other end is clamped between the ground strip 24 and the bottom of a central spacing block 33, the resilient strip 32 being thus itself supported at one end between the ground strip and the spacing block and at its other end resiliently carrying the condenser.

The block 33 may be of any material having requisite strength such as wood. It is recessed at 34, 35, 36, 37, respectively. The recess 34 receives and seats the vacuum gauge and that at 35 passes and clears a rubber tube 38 from the vacuum gauge. The recess 36 gives room for the bent portion of the tubing 38 and the ground wire 39 that connects with the ground strap 24. That at 37 receives a portion of the common ground lever 29.

Multiple units, suitably alike (and for cooperative use with one another and with the vacuum gauge, the ancillary or substitute condenser and the common ground switch) include each a body 40 of insulating material as bakelite, a metallic disc terminal 41 (for connection to external high tension test wire 26, that connects to one of the spark plugs while engine is under test), a neon or other high tension indicator and internal main test connections.

In the illustration each body comprises largely a block of bakelite or other suitable material recessed at 43 to receive and seat the terminal 41. The latter is preferably in the form of a metal disc because this disc gives a large area for contact with associated cooperating parts.

Within the recess start two passages 44 and 45 which may be cored or bored according to the method of manufacture of the body. The passage 44 receives a neon tube so as to indicate the presence of high frequency current and connections by which the neon tube is supported safely. The support for the neon tube as shown comprises springs 46 and 47 at the two ends of the tube, the spring 46 engaging preferably a closed end of the passage at 48 and the spring 47 engaging the disc terminal. Between these springs the neon tube is held in position to be observed through apertures 49 in the cover and 50 in the body. The springs 46 and 47 of course add to the capacity of the neon tube connection.

The passage 45 contains a contact rod 51 engaging with the terminal disc, a spring 52 by which the rod is kept pressed against the disc and a plug 53 screwed into a threaded end of the passage and used both to compress the spring 52 and to carry a preferably adjustable contact 54 by which switch connection is made as hereinafter described. The adjustment of the contact 54 is secured in the illustration by threading it into the plug.

As seen best in Figure 3 in bottom plan view the respective bodies are mainly solid at the front, though allowing for the passages already described, but are hollow at the rear. This hollow might be formed in the block. For convenience of manufacture the rear is bifurcated and the bifurcations or sides 55 and 56 are fastened to an end piece 57 which stiffens and closes the ends. The sides straddle individual switch mechanisms and also the release arms for "common" grounding and release. The spacing of the sides from each other is greater as shown, near the middle of the body at 58 than at the rest of the rear portions of the blocks.

Viewed in side elevation the blocks are also cut down at the top at 59 to provide room for mounting plates 60 by screws 61. The plates 60 support the individual switches and the grounding connections operated by them. For convenience in illustration standard switches have been shown as supported from these plates but they have been modified by use of special rocker switch blades 63 with spring full stroke mechanisms.

The end pieces 51 of the block carry each a screw 64 to provide a rearward stop for the rocker blade of the selector switch.

The rocker blade 63 of the selector switch is pivoted at 65 and electrically connects with plate 60—and ultimately to ground—through toggle compression spring 66 and toggle arm 67 pivoted on pin 68. The pivot pin 68 is pressed against plate 60 by the spring 66.

The electrical connections of plates 60 to ground lie through angle strips 69 and the flanges 70 of shield plates 71, which engage with the ground strip 24 passing along the bottoms of the respective blocks. By this construction all of the selector switches are connected with the ground, the idea being that various circuits to the spark plugs may thus be grounded individually by throwing the respective switches so as to shift the rocker blades to the right as seen in Figure 4, making the connections through the adjustable contact screws 54 or that the individual rocker switch blades may be thrown to the left and merely rest in position as seen in dotted lines in Figure 4, against the stop screws 64.

It will be noted that the compression toggle spring used in connection with the shifting of the rocker blades when the switches are thrown constitutes a full stroke device by which not only is each rocker switch blade shifted from the one position to the other, but after the shift begins in either direction the blade is snapped to the contact position quickly by the spring and is held in contact position thereby.

The individual switch full stroke mechanism takes care of the setting of the individual switches so as to ground the individual spark plug connections or release them, not only individually but as to any groups of spark plugs or as to all of the spark plugs where desired. However, it is quite helpful to be able to temporarily release together all of the spark plug connections which have been grounded by the individual switches, in order that the engine may quickly pick up by reason of all of the cylinders again firing in their proper sequence, after which the original setting is renewed. For this reason, the function of the common release is temporarily to throw the rocker blades of all of the individual switches which are grounding test circuits away from their respective adjustable contact screws so as to return these several circuits to operating condition. This is effected by rocker lever 73 keyed upon shaft 74 and spanning the contact screw 54. The shaft is supported in suitable bearings. The levers are thrown, all at the same time by rotation of shaft 74. For convenience the shaft 74 has been placed in the lower part of the test set and room for it has been provided by setting the tester up on legs 75.

The shaft 74 is held in inactive position by a compression spring 76 and is oscillated against the pressure of the spring, during operation, by the common ground control, or release lever 30. The lever 30 is provided with telescoping extension 77 by which the shaft is rocked and the compression spring 76 is intended for the purpose merely of making sure that the lever returns to a position in which the circuits previously "set" for grounding are grounded as soon as the common ground is permitted to return to its spring set position.

The telescoping end 77 here fits within the next adjoining section 78 and is normally held in extended position by spring 79 but may be pressed downwardly to telescope within the section and may then be locked by engaging the notch 80 of the lever handle against the under side of the control panel.

Each high tension test wire 26 where it enters the recess of the body is preferably surrounded and gripped by a soft rubber insulating ring 82 compressed to place by an insulation plate 83 which surrounds the conductor and is pressed to place within the block by screws 84.

The number of blocks and switch structures carried thereby will correspond of course with the maximum number of cylinders in any engine to be investigated by the tester. Eight are shown in groups of four, the groups being on opposite sides of the spacing block 33 within which the vacuum gauge is supported.

The blocks are held together in their assembled positions by their attachment to the casing member 21 which also acts as a control panel. They are united also by the casing strip 22 and by the common ground strip 24 which strip 24 passes across the bottoms of the blocks and is held to them tightly by screws, as best seen in Figure 3.

It will be noted that the high tension test wires 26 are kept from bending too abruptly and are resiliently supported also against lateral movement by grommets 85 and that these rings also protect against leakage of moisture along the wires which pass through the grommets into the respective blocks 40.

Though each block is provided with an individual ground switch and individual connection to a spark plug it is not necessary to supply separate vacuum tube or hose connection for each, one vacuum connection being sufficient unless there be more than one carburetor. Even with more than one carburetor the single vacuum connection will ordinarily answer.

The selector switch levers are located in upwardly facing recesses 86 of the control panel.

The tester is provided with hooks 87 attached to any suitable part of the unit for convenience in hanging the tester from the radiator rod or any other part of the car under test. While the main case or shell is preferably made of metal the control panel 21 and the strip 22 may be of bakelite, ebonite or other insulating material.

For some purposes there is an advantage in grounding the rocker shaft 74 to the ground strip 24. This is shown in the illustration in Figure 3 where the grounding is effected by a spring 74'. When it is grounded the operator is not protected against shock in case he fails to make proper ground connection of the strip 24 to the ground of the car. Where the shaft and common ground control lever are so grounded, and unless the control lever be of insulating material, though the operator will receive a shock it will remind him of the fact that the ground strip 24 has not been connected to the ground of the car and will act as a check against attempt to test without proper connections.

The side walls of the bifurcated or apertured part of the block must of course be thick enough and of high enough dielectric capacity and have high enough resistance against puncture not to be affected by the high frequency current carried by the switch members under the most severe condition of test.

An important detail of the invention relates to the shielding of the parts of one block from those of the next. In particular the test circuits including the neon tubes and grounding switches must be protected against interference one with another. This is effected in the form of Figures 1 to 6 by the use of the grounded shielding plates between adjoining sections or blocks. These shields preferably extend not only past the neon tubes but past the grounding switches also and thus preferably cover the entire side surfaces of the individual blocks. Such a shield at one side of each block is sufficient since each shield then separates between its block and the next one on one side and the opposite side is taken care of by the shield of an adjoining block.

The connection between the common ground release shaft 74 and its lever 29' is preferably made adjustable and this adjustment is shown in Figure 2 as being effected by splitting the lever 29' at 88 adjacent the shaft and drawing the two split parts of the lever together about the shaft by means of a screw 89 whose head 90 positions one end of spring 76 the other end of which is held by a strap 91.

In Figures 7 and 8 are shown covers 92 sliding in guides 93 over the switches of individual blocks, in Figure 7 one of these covers is shown as retracted from its switch so as to allow use of the switch at the left position and the other is shown as covering the switch at the right. The purpose of any such cover is to avoid careless or thoughtless attempted use of the extra block units where an engine is being tested having fewer cylinders than testing blocks and switches.

In Figures 9 and 12, 23' is a dual vacuum gauge with which are used dual vacuum connections 38' so that connection can be made with each of two manifolds when necessary. As elsewhere suggested this is not always necessary even with dual carburetors and manifolds; for example when there is an equalizing passage between the manifolds. In the embodiment of Figures 9 to 15 the blocks 40' are shown which may be of any suitable insulating material depending in considerable upon whether they are to be molded or cut to form. The high tension switch chamber recesses 58', terminal recess 43', neon tube passage 44', conductor passage 45' and openings 49' and 50' for observation of the neon tube are shown.

The parts which correspond generally with parts of the form shown in Figures 1 to 6 have been given corresponding letters primed.

The chief distinctions between the two forms are as follows:

The high tension connection of Figure 9 is removable and the removability is effected as follows: The conductor 26' is provided with a suitable ebonite or Bakelite terminal of generally rectangular "key" construction having a head 95 that in one angular position can be passed through a key-hole slot 95' and by a quarter turn locked or anchored to position, as seen in Figures 10 and 14. Connection between the conductor 26' and the neon tube and high tension conductor respectively is made by two discs 96 and 97 pressed in opposite directions by a spring 98. In the illustration the disc 97 is shown as directly connecting with the neon tube with or without the protective spring at the opposite end of the neon tube. The connection to the high tension conductor (preferably using a contact rod as in the previous form) is made through a spring 52'.

The key and key-hole slot connection may be sufficient guard against release by seating the insulation head 95 in a notch 99. The contact between the disc and the electric conductor 26' is preferably made by extending the conductor 26' through the head and terminating it in a conducting button 101 in position to engage to advantage with disc 96. The switch proper, shown best in Figures 13 and 17, comprises a blade 102 pivoted on shoulders 103 and terminating at the lower end in a tongue 104 which makes contact at one end of the blade stroke (solid lines) as seen in Figure 13 with the high tension conductor. At the other end of this stroke it merely rests in space permissibly free from contact from any of the adjoining structure. This is shown in the dotted lines in the figure.

The upper end of the blade is shown as presenting an opening 105 which passes over a spring 106. The spring is downwardly bent at 107 so as to present oppositely facing cam surfaces 108 and 109 which press against the lower edge 110 of the opening 105 so as to snap the blade in either of its opposite positions, or at least reliably to retain the blade in either of these positions.

Instead of the metal sheet shields shown in the preceding figures the individual blocks are here wrapped in tin foil shown at 111 and the blocks are pressed in two directions by springs 112 and 113 to hold the tin foil wrapped blocks in position so that they will tightly press upwardly and rearwardly, both holding the blocks in place and pressing the foil coverings against the grounded metal of the casing. The springs 112 push the blocks upwardly to press the tin-foil against the metal top of the box and the springs 113 press the blocks rearwardly (Figure 13). The springs 112 and 113 also themselves electrically connect the foil coverings of the blocks with the metal interior of the box.

The upper end 114 of each of the switch blades 102 passes through an opening in a bail 115, the bail being pivoted at the bottom at 116 so as to swing about the pivot between stops. The stops may be located as at 117 and 118 on the bail and in position properly to limit the movement of the bail by engaging opposite sides of a structural strip S carrying the springs 106. The upper ends 114 of the blades ride in slots 119 of the bail, one slot being shown for each set of four blades. Each switch blade can thus have independent movement in the normal position of the bail seen in Figure 11 between the limits shown in Figure 13, but all of the blades can be controlled by movement of the bail in one direction or the other to shift all of the blades to position of engagement or non-engagement as desired.

Eccentric pivoted stops 120 can be turned across the slots in the line of movement of the respective switches for spark plugs which are grounded as seen, two in the upper part of Figure 9 and one in the lower part of the figure, for the purpose of carrying the switches with the bail in both directions of movement so that when all of the switches are equalized by movement of the bail in one direction, those for which the eccentric stops have been set will be carried back with the return of the bail, though the width of the slot will provide clearance between the bail and other switches to prevent the other switches from being so carried back.

The spring pin 121 and appropriate openings 122 retain the bail at opposite ends of its stroke as against accidental or casual displacement.

It will be evident that while in Figures 1–6 the spring pressure of the switch blades against ground when in grounded position allows spring retarded movement away from ground without throwing their control levers and makes it possible to release all of the grounded switch blades from ground connection without operating their levers and they are thus free to return to ground when the releasing pressure is no longer present, this is not true in the form in Figures 9–17. In this latter form the switch must be thrown both ways, i. e., released and later re-applied.

*Operation*

With the selector switches in their off position and a warm engine the tester is suitably hung to the radiator rod and grounded by connecting the wire 39 or 39' to clean metal of the engine or frame—after which the wire, 26 or 26' are connected respectively to the spark plugs and the vacuum tube 38 or 38' is connected to the intake manifold.

Tests of the engine idling may be made with throttle closed and the selector switches in their off-ground position. If conditions are normal the neon tubes will all show normal flashing, indicating that the ignition voltages are right at all plugs and the vacuum will be fairly steady at its high value, usually about 18 inches of mercury, and should drop off somewhat if the carburetor adjustment be moved in either direction.

If, after adjustment of the carburetor for maximum vacuum, the conditions are not normal, first any fault or faults of the ignition system, shown up by a weak flashing or no flashing at one or more of the neon tubes, is or are corrected, after which, particularly if the vacuum be unsteady and/or low, a check is made to see if all cylinders are firing or firing evenly.

The combination between the vacuum gauge 23 or 23', release lever and selector switches makes the above test an easy one with my mechanism since the tests of the different parts may be taken under the same engine conditions and without the loss of time and instantaneous engine values inevitable where it is necessary to make other connections before some parts of the test can be made.

Test of each individual cylinder while idling cannot be maintained long as the engine will stall. The quick and easy release of the grounding of all other cylinders with automatic return to the same cylinder—or cylinders—subsequently is necessary if changes in the operation of the engine between different parts of the test are to be avoided.

When the individual cylinders or groups of cylinders are being tested idling, the engine is first run idling, warm and with all cylinders firing and the throttle closed and the vacuum gauge indicating its high value of perhaps 18 inches of mercury. The individual cylinders or groups of cylinders are then tested successively by momentarily grounding all the other cylinders when the relative rapidities of vacuum drop, as indicative of the relative rapidities of loss of speed and therefore roughly of the drop in power, are noted; and the flashing of the neon tubes gives a simultaneous check upon the operation of the cylinders and can be observed for spark strength and regularity. If the flashing at a neon tube be weak or miss for one only of the cylinders, ignition trouble is indicated, as at the cam of the distributor, either at the make or break portion thereof. Where two cylinders are coupled and show as weak the question of which causes the trouble can be determined by comparing each of them with the same other cylinder, but if the cylinders be side by side gasket leakage in between them must be watched.

The simultaneous determination and comparison of engine operation on one or say two cylinders, with intermediate speeding by freeing the other cylinders from ground, of neon tube flashing and of the vacuum strength and rate of fall of vacuum when changing from use of all the cylinders to the use of a single cylinder or a pair of cylinders gives a basis of understanding of the engine's operation previously lacking in testers of this character.

The mechanism can be used to check carburetor adjustment for quick pick up to test faults within the pick up range. With all of the cylinders idling the throttle is quickly and repeatedly opened wide for short periods but not long enough to let the motor race unduly. The shortness of the periods for the vacuum to reach a specified value after its immediate drop at each opening of the throttle, as indicative of the relative quickness of pick-up with different carburetor adjustments, may be determined from the second hand of a stop watch 123. The neon tubes are watched meantime for continued maintenance of ignition voltages during the pick up and weakness or unsteadiness in the neon flashes will indicate ignition trouble.

Slow speed full load test for each cylinder by itself with the throttle wide open but exactly in the same position for each of the different cylinders may be effected. The vacuum gauge readings will disclose by low vacuum reading any miss or loss of power in the individual cylinder or cylinders and after all the cylinders have been individually full load tested it is a check on the entire engine power output. The low vacuum reading with any cylinder alone on full load as compared to the vacuum readings with other cylinders alone on full load may be due for example, to trouble with the spark, mixture, timing or compression. The determination of which of these is causing the trouble must be made separately.

One weak cylinder indicates loss of compression in that particular cylinder due to some local cause such as bad rings, bad valves or external cylinder head gasket leakage. Two adjacent weak cylinders generally indicate an internal cylinder head gasket leakage.

In case of internal leakage the vacuum needle will fluctuate badly. The vacuum gauge discloses many other weaknesses such as the lack of synchronism of two ignition circuits, where there are separate ignition contacts and differences in operation of mixture between two carbureters. Differences in the readings of the vacuum gauge will show up also any differences in power output of the different cylinders and differences in their smoothness of operation.

Where all the cylinders are weak general troubles are indicated such as the cam shaft being out of time, improper oil, late ignition.

The vacuum gauge is of great help in indication of sluggish or sticking valves.

Because sluggish valves affect low speed operation less than high speed operation and some forms of improper contact point or other adjustment show up differently at different speeds my invention may be used today also in comparison of the operations at these different speeds.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention what I claim as new and desire to secure by Letters Patent is:

1. A tester device for use in testing a multicylinder spark plug ignition internal combustion engine and having in assembly the combination of selector switch and ignition voltage indicating units, each switch-and-indicator unit including a switch contact, an ignition tension indicator, means for electrically connecting the contact and the indicator to a spark plug, a switch element adapted in one position to engage the contact, and an insulation housing mounting the contact, indicator, said means and said switch element, metal sheet between the units, and means for continuously grounding the sheet metal and the switch elements.

2. A tester device for use in testing a multicylinder spark-plug-ignition internal combustion engine and having in assembly the combination of selector-switch and ignition-voltage indicator units, each switch-and-indicator unit including a switch contact, a neon tube, means for electrically connecting the contact and tube to a spark plug, a switch element adapted in one position to engage the contact, and an insulation housing mounting the contact, neon tube, said means and element, metal sheets between the units and means for continuously grounding the sheet and elements.

3. A tester device for use in testing a multicylinder spark plug ignition internal combustion engine and having in assembly the combination of selector-switch and ignition-voltage indicator units, each switch-and-indicator unit including a switch contact, a neon tube, means for electrically connecting the contact and tube to a spark plug, a switch element adapted in one position to engage the contact, and an insulation housing mounting the contact, neon tube, said means and element, metal sheets between the units, means for continuously grounding the sheets and the elements and common shift mechanism for shifting the switch elements out of engagement with their respective contacts.

4. A tester device for use in testing a multicylinder spark-plug ignition internal combustion engine and having in assembly the combination of selector-switch and ignition-voltage indicator units, each switch-and-indicator unit including a switch contact, a neon tube, means for electrically connecting the contact and tube to a spark plug, a switch element adapted in one position to engage the contact, and an insulation housing mounting the contact, neon tube, said means and element, metal sheets between the units, means for continuously grounding the sheets and the elements, common shift mechanism for shifting the switch elements out of engagement with their respective contacts and a vacuum gauge for vacuum connection to the engine manifold.

5. In a tester for investigating the condition of an internal combustion engine, the combination of a plurality of flexible leads for electrical engagement with the respective spark plugs of the engine, a plurality of contacts, one terminating each of the leads, common ground mechanism adapted to be connected to the ground of the engine, a plurality of switches, each including a grounded blade, a finger shift and a spring adapted to press the blade in either direction according to the position of the shift, the blade adapted to engage with or disengage from one of the contacts and disconnecting mechanism common to all the blades adapted to release from the contacts all of those switch blades which have been connected to the contacts without changes of the settings of the corresponding shifts and when not in use to permit the switch blades to return to their contacts.

6. In a tester for spark igniting, engine circuits, a plurality of circuit terminals, one for each ignition circuit, a plurality of grounded toggle switches, each having a switch lever, a switch blade and a spring between the lever and blade whereby movement of the lever shifts the terminus of the spring and throws the blade against or away from a cooperating terminal while permitting the blade to be moved away from its terminal against the spring, each blade in one position engaging one circuit terminal, and a common ground release means including an insulated arm for each ignition circuit adapted to engage a corresponding switch blade when the blade is engaging its circuit terminal to ground the latter, to repel the blade from the terminal when the release means is operated and to permit its return to the terminal when the means is released.

7. In a test mechanism for testing the conditions of the cylinders in a spark ignited explosion engine, a plurality of individual units each comprising a lead adapted for connection with a spark plug, a grounded switch, a lead terminal with which the switch is adapted to connect and a neon tube indicator for determining roughly the tension of the circuit, grounded metal shields between the neon tubes of successive units, between the lead terminals of successive units and between the switches of successive units, protecting against disturbance of the neon tube in one circuit by an adjoining circuit and against leakage from the switch of one circuit to the switch of the next and common means for opening all of the circuits at the terminals at the same time.

8. In a tester for spark ignition fuel combustion engines, a plurality of test units each comprising a flexible lead for engagement with a spark plug, a grounded switch having a pivoted lever, and including a separately pivoted switch blade, a compression spring engaging the lever and the blade whereby shifting the lever shifts the blade, and a lead contact with which the blade resiliently engages in one position, a shaft extending past the plurality of units and insulated arms on the shafts extending one into each of the units, adapted to engage the blades when in contact position and means for turning the shaft to carry the blades away from contact while the positions of their levers remain unchanged and on release permitting the blades to spring back into engagement with the terminals.

WILLIAM E. HAUPT.